United States Patent [19]
Gmeiner et al.

[11] 3,711,056
[45] Jan. 16, 1973

[54] SEAT-ADJUSTING MECHANISM, ESPECIALLY FOR VEHICLE SEATS

[75] Inventors: Günter Gmeiner, Sindelfingen; Christian Grabner, Maichingen, both of Germany

[73] Assignee: Daimler-Benz Aktiengesellschaft, Stuttgart-Untertuerkheim, Germany

[22] Filed: July 14, 1970

[21] Appl. No.: 54,812

[30] Foreign Application Priority Data

July 22, 1969 Germany ................. G 69 28 888.6

[52] U.S. Cl. ................................................. 248/429
[51] Int. Cl. ............................................. F16m 13/00
[58] Field of Search ...... 248/411, 429, 430; 108/143; 306/3.6; 74/527

[56] References Cited

UNITED STATES PATENTS

| | | |
|---|---|---|
| 3,450,425 | 6/1969 | Leonhardt ................. 248/430 X |
| 2,149,946 | 3/1939 | Whedon et al. ................. 248/429 |
| 3,013,763 | 12/1961 | Weberman ................. 248/429 |
| 3,479,099 | 11/1969 | Krause ................. 248/429 X |
| 3,189,313 | 6/1965 | Burns ................. 248/429 |
| 2,844,430 | 7/1958 | Bogar ................. 308/3.6 |

*Primary Examiner*—William H. Schultz
*Attorney*—Craig & Antonelli

[57] ABSTRACT

A seat-adjusting mechanism, particularly for vehicle seats, in which a seat frame is movably arranged in the vehicle longitudinal direction by slide members displaceable in guide rails and in which the fixing of the pre-selected seat position takes place by an engageable toothed arrangement; the slide members of one guide rail abut at least within the lower area thereof at the walls surrounding the same and the clearance between the upper edge of the slide members and the upper wall of the guide rails is compensated for by a spring-loaded cam rotatably supported between the slide members at the side walls of the seat frame.

7 Claims, 5 Drawing Figures

SEAT-ADJUSTING MECHANISM, ESPECIALLY FOR VEHICLE SEATS

The present invention relates to a seat-adjusting mechanism, especially for vehicle seats, in which a seat frame is movably arranged in the vehicle longitudinal direction by means of slide members displaceable in guide rails and in which the fixing of the selected seat position takes place by means of an engageable toothed arrangement.

A favorable transmission of the forces from the seat to the guide rails secured at the vehicle floor takes place with this type of seat adjustment because the force-transmitting places between the vehicle floor and the seat remain unchanged relative to the seat.

Since great value is placed on the absence of noise in seat-adjusting mechanisms, the guide rails and slide members had to be constructed heretofore with small tolerances. This entailed a considerable increase in cost, especially as the installation of the guide rails had to be carried out with the greatest care.

In order to obviate this shortcoming, it is proposed that according to the present invention, the slide members consisting preferably of synthetic resinous material abut in one of the guide rails at least within the lower area at the walls surrounding the same whereby the play or clearance between the upper edges of the slide members and the upper wall of the guide rail is compensated for by one spring-loaded cam each rotatably supported between the slide members at the side walls of the seat frame.

In a further advantageous construction of the present invention, the disengagement of the cams may take place during the disengagement of the shift lock members provided with a row of apertures which may be connected with each other by a rod provided with an actuating lever.

In case of a mutual displacement of the two guide rails or in case of a twisting of the seat, a locking engagement on at least one side is achieved if one of the shift-lock members is rigidly connected with the rod and is pressed by a spring against a toothed bar projecting from each guide rail in the downward direction and if the other shift lock member is constructed elastically.

The locking operation is facilitated if the teeth of the toothed bar have a narrow head portion that, after an inclined transition section, runs out on both sides into a wide base part.

Accordingly, it is an object of the present invention to provide a seat-adjusting mechanism which avoids by simple means the aforementioned shortcomings and drawbacks encountered in the prior art.

Another object of the present invention resides in a seat-adjusting mechanism, especially for vehicle seats, which assures substantial freedom from noise in the seat-adjusting mechanism, yet dispenses with the requirement of small tolerances as regards the manufacture and installation of the guide rails and slide members.

A further object of the present invention resides in a seat-adjusting mechanism which assures a satisfactory engagement of the shift lock mechanism even in case of twisting of the seat or mutual shifting of the guide rails.

These and other objects, features and advantages of the present invention will become more obvious from the following description when taken in connection with the accompanying drawing which shows, for purposes of illustration only, one embodiment in accordance with the present invention, and wherein.

Figure 3:
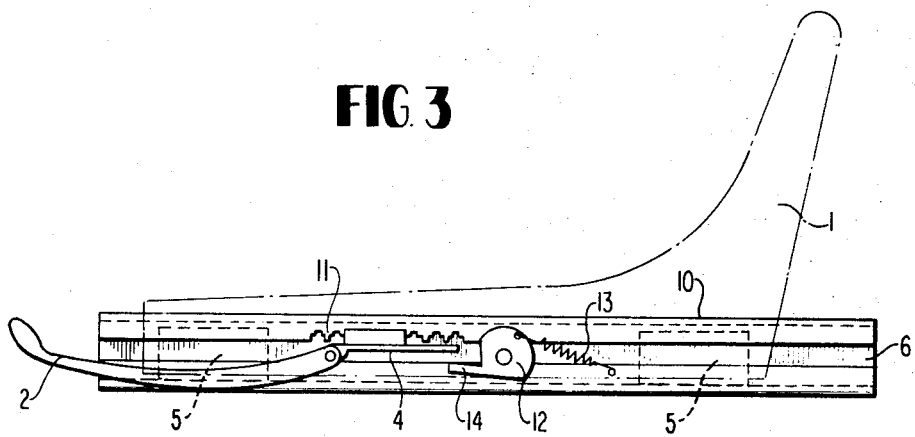
Figure 4:
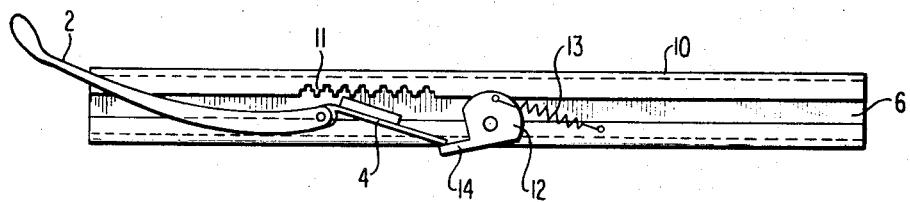
Figure 5:
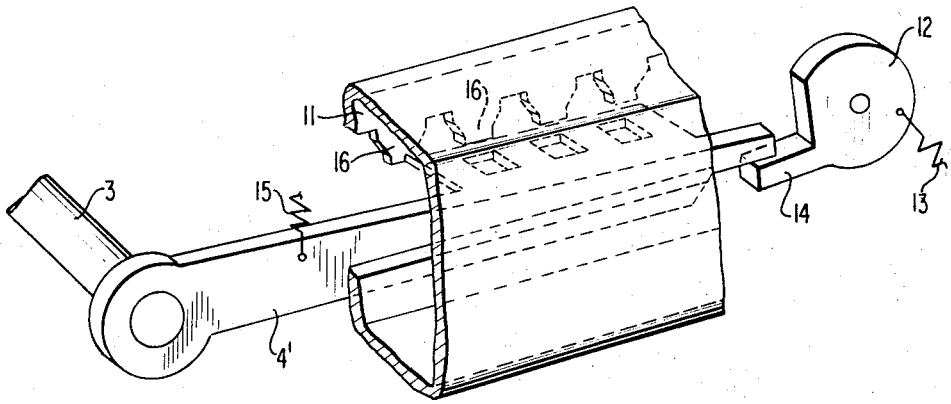

FIGS. 3 and 4 are somewhat schematic side elevational views of a seat-adjusting arrangement in accordance with the present invention and illustrating, respectively, the engaged and disengaged condition of a shift-locking means with its effect on a cam; and FIG. 5 is a partial perspective view, partially broken away, of a seat guide rail with a disengaged shift-lock means of another type in accordance with the present invention.

Figure 1:
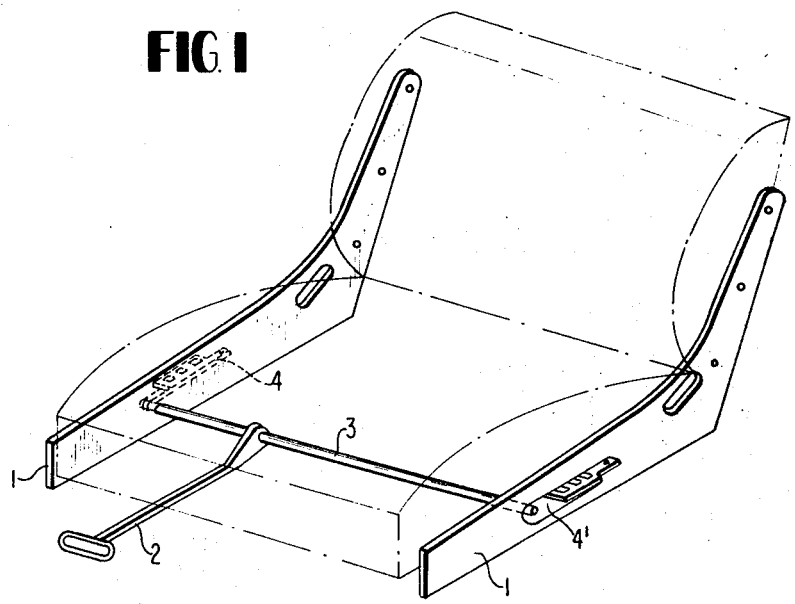
FIG. 1 is a somewhat schematic perspective view of a part of an adjusting mechanism supported in the two side walls of the seat frame in accordance with the present invention.

Referring now to the drawing, wherein like reference numerals are used throughout the various views to designate like parts, and more particularly to FIG. 1, reference numeral 1 designates in this figure the two side walls of a seat frame, not illustrated otherwise in detail. A rod 3 provided with an actuating lever 2 is supported in the two side walls 1; the rod 3 is connected at each of its ends with a shift-lock member 4 provided with a row of openings or apertures. Whereas one shift lock member 4 is constructed elastically in a conventional manner, the other shift-lock member 4' is rigidly connected with the rod 3.

Figure 2:
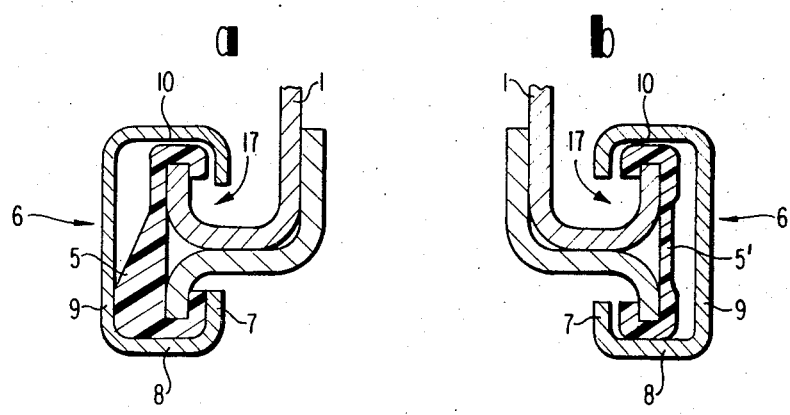
FIG. 2 is a partial cross-sectional view showing in FIGS. 2a and 2b the arrangement of the slide members in the left and right guide rails, respectively, in accordance with the present invention.

As shown in FIG. 2, the side walls 1 carry the slide members 5, 5' made from any conventional synthetic resinous material which are displaceable in the vehicle longitudinal direction in the guide rails generally designated by reference numeral 6. Two slide members are displaceably arranged in each guide rail as shown in FIG. 3 with the two slide members 5 of a respective guide rail 6 (the left guide rail 6 in FIG. 2) abutting in the lower area thereof against the walls 7, 8 and 9 surrounding the same whereas the two slide members 5' of the other guide rail 6 (the right guide rail 6 of FIG. 2) have a spacing with respect to the corresponding walls 7 and 9. As shown, a portion of the side walls 1 extend through a longitudinal aperture 17 in the wall 7 for connection with the slide members 5 and 5'. Both types of slide members 5 and 5' have a clearance between their upper edge and the upper wall 10 of the guide rail 6. An easy displaceability of the slide members 5, 5' notwithstanding occurring manufacturing tolerances is achieved by these measures, on the one hand, whereas on the other, no disturbing cross movements of the seat can occur.

In FIG. 3, the engaged condition of a shift-lock member 4 is illustrated which is constructed elastically e.g., of a resilient material and whose row of apertures engages into a toothed bar 11 projecting downwardly from the guide rail 6. A cam 12 is rotatably supported at the side wall 1 between the two slide members 5, schematically shown in dashed line, which as a result of the force of a spring 13 presses against the upper wall 10 of the guide rail 6 and thus prevents a rattling of the slide members 5 and 5'.

If—as illustrated in FIG. 4—the actuating lever 2 is lifted, then the shift-lock member 4 pivots downwardly and releases the toothed bar 11. Simultaneously, the rear end of the shift-lock member 4 presses on an extension 14 projecting from the cam 12 and thus unlocks the slide members 5 and 5'.

FIG. 5 once again represents schematically the cooperation of a disengaged shift-lock member 4' with the toothed bar 11 whereby the shift-lock member 4' is formed as a rigid member connected with the rod 3 and is drawn in the direction of the toothed bar 11 by a spring 15 connected with the side wall in a conventional manner (not shown). The teeth 16 of the toothed bar 11 have a relatively narrow head which terminates in a wide base part after an inclined transition on both sides. The engaging operation of the shift-lock members 4' is facilitated thereby and a completely satisfactory anchoring in the toothed bar 11 is achieved.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. A seat-adjusting mechanism comprising guide rail means, slide means connected to at least one side wall of a seat frame, said slide means including first and second portions arranged for displacement in said guide rail means, said guide rail means including tooth means, shift-lock means carried by the side wall of the seat frame for engaging said tooth means to fix a selected seat position, said guide rail means including opposed upstanding walls and upper and lower walls surrounding said slide means, one of said walls having an aperture therethrough in which the connection of the side wall of the seat frame to said slide means is disposed, said slide means abutting at least at the lower wall of said guide rail means and having an upper edge thereof spaced from the upper wall of said guide rail means, and spring-loaded cam means rotatably supported at the side wall of the seat frame intermediate said first and second portions of said slide means for compensating for the space between the slide means and the upper wall of said guide rail means by abutting at the upper wall in a selected fixed position for preventing movement between the upper and lower wall of said guide rail means.

2. A seat-adjusting mechanism as defined in claim 1, wherein said shift-lock means is provided with a row of apertures adapted to receive said tooth means of said guide rail means, said shift-lock means being connected to a rod having an actuating lever connected thereto whereby movement of the actuating lever causes said shift-lock means to disengage from said tooth means and to contact said cam means to move said cam means out of abutment with said guide rail means.

3. A seat-adjusting mechanism as defined in claim 2, wherein said guide rail means includes two guide rails having said slide means displaceably arranged therein, and said slide means of one of said guide rails abutting at least within the lower area of the opposed upstanding walls and lower wall of said guide rail.

4. A seat-adjusting mechanism as defined in claim 3, wherein one of said shift-lock means is formed as a rigid member and includes a spring for biasing said rigid member into engagement with said tooth means of said guide rail means, said tooth means being a toothed bar projecting downwardly from each guide rail, and the other of said shift-lock means is formed as a resilient member for engagement with said tooth means.

5. A seat-adjusting mechanism as defined in claim 4, wherein said toothed bar is provided with teeth having a relatively narrow head portion which run out into a relatively wide base portion by way of inclined transition portions on both sides.

6. A seat-adjusting mechanism as defined in claim 5, wherein the seat is a vehicle seat arranged for adjustment in the vehicle longitudinal direction.

7. A seat-adjusting mechanism as defined in claim 6, wherein said slide means is formed of synthetic resinous material.

* * * * *